United States Patent
Abadir et al.

(10) Patent No.: US 11,764,966 B2
(45) Date of Patent: *Sep. 19, 2023

(54) SYSTEMS AND METHODS FOR SINGLE-STEP OUT-OF-BAND AUTHENTICATION

(71) Applicant: Powch, LLC, Lancaster, PA (US)

(72) Inventors: Essam Abadir, Lancaster, PA (US); Rosco Schock, Lancaster, PA (US)

(73) Assignee: Powch, LLC, Lancaster, PA (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/464,409

(22) Filed: Sep. 1, 2021

(65) Prior Publication Data

US 2021/0399895 A1 Dec. 23, 2021

Related U.S. Application Data

(63) Continuation of application No. 16/548,979, filed on Aug. 23, 2019, now Pat. No. 11,133,934.

(Continued)

(51) Int. Cl.
*H04L 9/32* (2006.01)
*H04L 9/08* (2006.01)
(Continued)

(52) U.S. Cl.
CPC .......... *H04L 9/3234* (2013.01); *G06F 21/31* (2013.01); *G06F 21/602* (2013.01);
(Continued)

(58) Field of Classification Search
CPC ... H04L 9/3234; H04L 9/0819; H04L 9/0825; H04L 9/0863; H04L 9/0877; H04L 9/0891; H04L 9/0894; H04L 9/3213; H04L 9/3247; H04L 63/123; H04L 63/18; H04L 2463/082; H04L 63/0428; H04L 63/0807;
(Continued)

(56) References Cited

U.S. PATENT DOCUMENTS 7,137,006 B1   11/2006   Grandcolas et al.
8,256,664 B1 *  9/2012   Balfanz .................. G06F 21/36
                                                        235/375

(Continued)

FOREIGN PATENT DOCUMENTS

WO   WO-2014016621 A1 *   1/2014   ......... H04L 63/0823

OTHER PUBLICATIONS

Mahmoud Musa Mohammed, A multi-layer of multi factors authentication model for online banking services, Published in: 2013 International Conference on Computing, Electrical and Electronic Engineering (ICCEEE), Date of Conference: Aug. 26-28, 2013, 5 pages (Year: 2013).*

(Continued)

*Primary Examiner* — Shahriar Zarrineh
(74) *Attorney, Agent, or Firm* — Fox Rothschild LLP

(57) ABSTRACT

A method of performing out-of-band user authentication includes, by a service electronic device associated with a service a request to initiate a session of the service, generating an authentication token, encrypting the authentication token to generate an encrypted authentication token, and transmitting the encrypted authentication token to the electronic device.

17 Claims, 5 Drawing Sheets

Related U.S. Application Data

(60) Provisional application No. 62/735,592, filed on Sep. 24, 2018, provisional application No. 62/722,410, filed on Aug. 24, 2018, provisional application No. 62/722,630, filed on Aug. 24, 2018.

(51) Int. Cl.
  *H04L 9/40* (2022.01)
  *G06F 21/31* (2013.01)
  *G06F 21/60* (2013.01)
  *G06K 7/14* (2006.01)

(52) U.S. Cl.
  CPC ......... *G06K 7/1413* (2013.01); *G06K 7/1417* (2013.01); *H04L 9/0819* (2013.01); *H04L 9/0825* (2013.01); *H04L 9/0863* (2013.01); *H04L 9/0877* (2013.01); *H04L 9/0891* (2013.01); *H04L 9/0894* (2013.01); *H04L 9/3213* (2013.01); *H04L 9/3247* (2013.01); *H04L 63/123* (2013.01); *H04L 63/18* (2013.01); *H04L 2463/082* (2013.01)

(58) Field of Classification Search
  CPC ..... H04L 63/126; G06F 21/31; G06F 21/602; G06K 7/1413; G06K 7/1417
  See application file for complete search history.

(56) References Cited

U.S. PATENT DOCUMENTS

| | | | |
|---|---|---|---|
| 8,510,816 B2 | 8/2013 | Quach et al. | |
| 8,578,454 B2 | 11/2013 | Grim | |
| 8,627,088 B2 * | 1/2014 | Mizrah | H04L 63/18 |
| | | | 713/176 |
| 9,055,029 B2 | 6/2015 | Narendra et al. | |
| 9,077,713 B1 | 7/2015 | Zheng et al. | |
| 9,094,212 B2 | 7/2015 | Thomas et al. | |
| 9,148,405 B2 * | 9/2015 | Narendra | H04L 63/20 |
| 9,313,185 B1 | 4/2016 | Pei | |
| 9,369,289 B1 | 6/2016 | Harrison et al. | |
| 9,402,181 B1 * | 7/2016 | Yi | H04L 63/08 |
| 9,985,786 B1 | 5/2018 | Bhabbur et al. | |
| 10,911,421 B1 * | 2/2021 | Golwalkar | H04L 63/0853 |
| 2005/0210253 A1 | 9/2005 | Shigeeda | |
| 2005/0273442 A1 | 12/2005 | Bennett et al. | |
| 2009/0290715 A1 | 11/2009 | Mityagin et al. | |
| 2010/0199089 A1 | 8/2010 | Vysogorets et al. | |
| 2010/0235637 A1 * | 9/2010 | Lu | H04L 63/0853 |
| | | | 713/168 |
| 2011/0197070 A1 * | 8/2011 | Mizrah | H04L 63/0869 |
| | | | 713/176 |
| 2012/0159603 A1 * | 6/2012 | Queck | H04L 9/3215 |
| | | | 726/9 |
| 2012/0204032 A1 | 8/2012 | Wilkins et al. | |
| 2012/0311322 A1 * | 12/2012 | Koyun | G06Q 20/3829 |
| | | | 713/155 |
| 2013/0145447 A1 | 6/2013 | Maron | |
| 2013/0219473 A1 | 8/2013 | Schaefer | |
| 2013/0262857 A1 * | 10/2013 | Neuman | H04L 63/083 |
| | | | 713/155 |
| 2014/0068723 A1 * | 3/2014 | Grim | H04L 63/08 |
| | | | 726/4 |
| 2014/0149746 A1 * | 5/2014 | Yau | H04L 9/3226 |
| | | | 713/185 |
| 2014/0337957 A1 | 11/2014 | Feekes | |
| 2015/0124963 A1 | 5/2015 | McCusker et al. | |
| 2015/0150111 A1 * | 5/2015 | Friedmann | H04L 63/0815 |
| | | | 726/9 |
| 2015/0169892 A1 | 6/2015 | Nord et al. | |
| 2015/0244525 A1 | 8/2015 | McCusker et al. | |
| 2015/0318993 A1 | 11/2015 | Hamlin et al. | |
| 2015/0350168 A1 * | 12/2015 | Hayton | G06F 21/32 |
| | | | 713/168 |
| 2016/0065590 A1 | 3/2016 | Gramelspacher et al. | |
| 2016/0125412 A1 * | 5/2016 | Cannon | G06Q 20/4014 |
| | | | 705/44 |
| 2016/0149923 A1 | 5/2016 | Zhang et al. | |
| 2016/0204933 A1 * | 7/2016 | Ronchi | H04W 12/04 |
| | | | 713/171 |
| 2016/0248752 A1 | 8/2016 | Blinn | |
| 2016/0286393 A1 | 9/2016 | Rasheed et al. | |
| 2016/0307194 A1 | 10/2016 | Bhatnagar et al. | |
| 2017/0118025 A1 * | 4/2017 | Shastri | H04L 9/3231 |
| 2017/0180136 A1 | 6/2017 | Ibasco | |
| 2017/0230363 A1 | 8/2017 | Deutschmann et al. | |
| 2017/0272427 A1 | 9/2017 | Robison et al. | |
| 2017/0288870 A1 | 10/2017 | Przydatek et al. | |
| 2017/0324737 A1 | 11/2017 | Evans | |
| 2017/0346804 A1 | 11/2017 | Beecham | |
| 2018/0060558 A1 | 3/2018 | Bruderek et al. | |
| 2018/0151182 A1 * | 5/2018 | Wyss | G10L 17/10 |
| 2018/0247082 A1 | 8/2018 | Durham et al. | |
| 2018/0309740 A1 | 10/2018 | Brun et al. | |
| 2019/0068585 A1 | 2/2019 | Zeng et al. | |
| 2019/0095606 A1 | 3/2019 | Lewis et al. | |
| 2020/0007530 A1 * | 1/2020 | Mohamad Abdul | |
| | | | H04W 12/009 |
| 2020/0099539 A1 | 3/2020 | Bernsen et al. | |
| 2020/0235932 A1 | 7/2020 | Gehrmann | |

OTHER PUBLICATIONS

Kapil Singh, Practical out-of-band authentication for mobile applications, Middleware Industry '13: Proceedings of the Industrial Track of the 13th ACM/IFIP/USENIX International Middleware Conference, Dec. 2013, Article No. 3, pp. 1-6, https://doi.org/10.1145/2541596.2541599 (Year: 2013).*

U.S. Appl. No. 16/548,973, filed Aug. 23, 2019, Secure Distributed Information System.

U.S. Appl. No. 17/325,887, filed May 20, 2021, Secure Distributed Information System.

U.S. Appl. No. 16/548,979, filed Aug. 23, 2019, Systems and Methods for Single-Step Out-of-Band Authentication.

U.S. Appl. No. 16/548,982, filed Aug. 23, 2019, Secure Distributed Information System for Public Device Authentication.

* cited by examiner

SYSTEMS AND METHODS FOR SINGLE-STEP OUT-OF-BAND AUTHENTICATION

CROSS-REFERENCE TO RELATED APPLICATIONS

This application claims the benefit of U.S. patent application Ser. No. 16/548,979, filed Aug. 23, 2019, which claims priority to: (1) U.S. Patent Application No. 62/722,630, filed Aug. 24, 2018; (2) U.S. Patent Application No. 62/722,410, filed Aug. 24, 2018; and (3) U.S. Patent Application No. 62/735,592, filed Sep. 24, 2018. The disclosures of each priority provisional and nonprovisional application are fully incorporated into this document by reference.

BACKGROUND

Out-of-band, two-factor, user authentication involves an additional method of security that is used to supplement login credentials when accessing webpages, software services, applications, networks, and/or the like. While out-of-band authentication services may offer an additional layer of security, most out-of-band authentication mechanisms require the use of additional physical hardware that is different from the hardware that is currently responsible for providing access to the webpages, software services, and/or applications. Integrating the additional hardware with the existing hardware is time consuming, labor-intensive, and expensive.

Moreover, the use of typical out-of-band user authentication mechanisms is cumbersome for users because the mechanism usually requires users to memorize a code or phrase and manually provide the code or phrase to the out-of-band authentication mechanism for processing.

SUMMARY

In an embodiment, a method of performing out-of-band user authentication includes, by a service electronic device associated with a service, receiving, from an electronic device, a request to initiate a session of the service, generating an authentication token, encrypting the authentication token to generate an encrypted authentication token, and transmitting the encrypted authentication token to the electronic device. The method includes, by the electronic device, receiving the encrypted authentication token, retrieving a public key and a private key associated with the electronic device from a data store, retrieving a service public key from a data store, where the service public key is associated with the service, decrypting the encrypted authentication token using the private key to obtain the authentication token, signing the authentication token with the private key to generate a signed authentication token, encrypting the signed authentication token with the service public key to generate a signed-encrypted authentication token, and sending the signed-encrypted authentication token and a security token to a server electronic device. The method includes, by the server electronic device, receiving a request for the signed-encrypted authentication token from the service electronic device, where the request includes a read token and an indication of a memory location accessible by the server electronic device, verifying that the read token matches information stored at the memory location, and in response to verifying that the read token matches information stored at the memory location, sending the signed-encrypted authentication token to the service electronic device.

In an embodiment, the service electronic device may decrypt the signed-encrypted authentication token using a private key associated with the service to obtain a signed-decrypted authentication token, verify the signed-decrypted authentication token using the public key associated with the electronic device to obtain a verified decrypted authentication token, determine whether the verified decrypted authentication token matches the authentication token generated by the service electronic device, and in response to determining that the verified decrypted authentication token matches the authentication token generated by the service electronic device, authenticate the request to access the service. The method may further include deleting the private key, the public key, the read token, the security token and the indication of the memory location from the electronic device.

The method my further include initializing an account for the service by the electronic device by receiving a request from the user to access the service, receiving the service public key from the service electronic device associated with the service, storing the service public key in a data store of the electronic device, generating the public key and the private key associated with the electronic device and storing the public key and the private key in the data store, generating the security token and the read token, transmitting the security token to the server electronic device, receiving from the server electronic device the indication of the location of where the security token is stored by the server electronic device, transmitting the public key, the read token and the indication of the location to the service electronic device to create a new account for the user, and deleting the public key, the private key, the security token, the read token and the indication of the location from the data store.

The service electronic device may create the new account for the user using the public key, the read token and the indication of the location. Encrypting the authentication token to generate an encrypted authentication token may include encrypting the authentication token using the public key associated with the electronic device. Receiving the encrypted authentication token may include receiving an image that includes the encrypted authentication token, and obtaining the encrypted authentication token by processing the image. The image may include a Quick Response (QR) code, and processing the image may include scanning the QR code to obtain the encrypted authentication token.

The electronic device may receive an indication that the user wishes to terminate the session of the service, and transmit the security token and the indication of the location to the server electronic device.

The server electronic device may receive the security token and the indication of the location from the electronic device, verify that the received security token matches content stored at the location, and in response to verifying that the received security token matches content stored at the location, sending an indication of a successful session termination to the electronic device. In response to verifying that the received security token matches content stored at the location, the read token and the signed-encrypted authentication token may be deleted from the location. The electronic device may delete the security token and the indication of the location by the electronic device.

The server electronic device may receive the security token and the indication of the location from the electronic device, verify that the received security token matches content stored at the location, and in response to verifying that the received security token does not match content stored at the location, sending an indication of an unsuccessful session termination to the electronic device.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
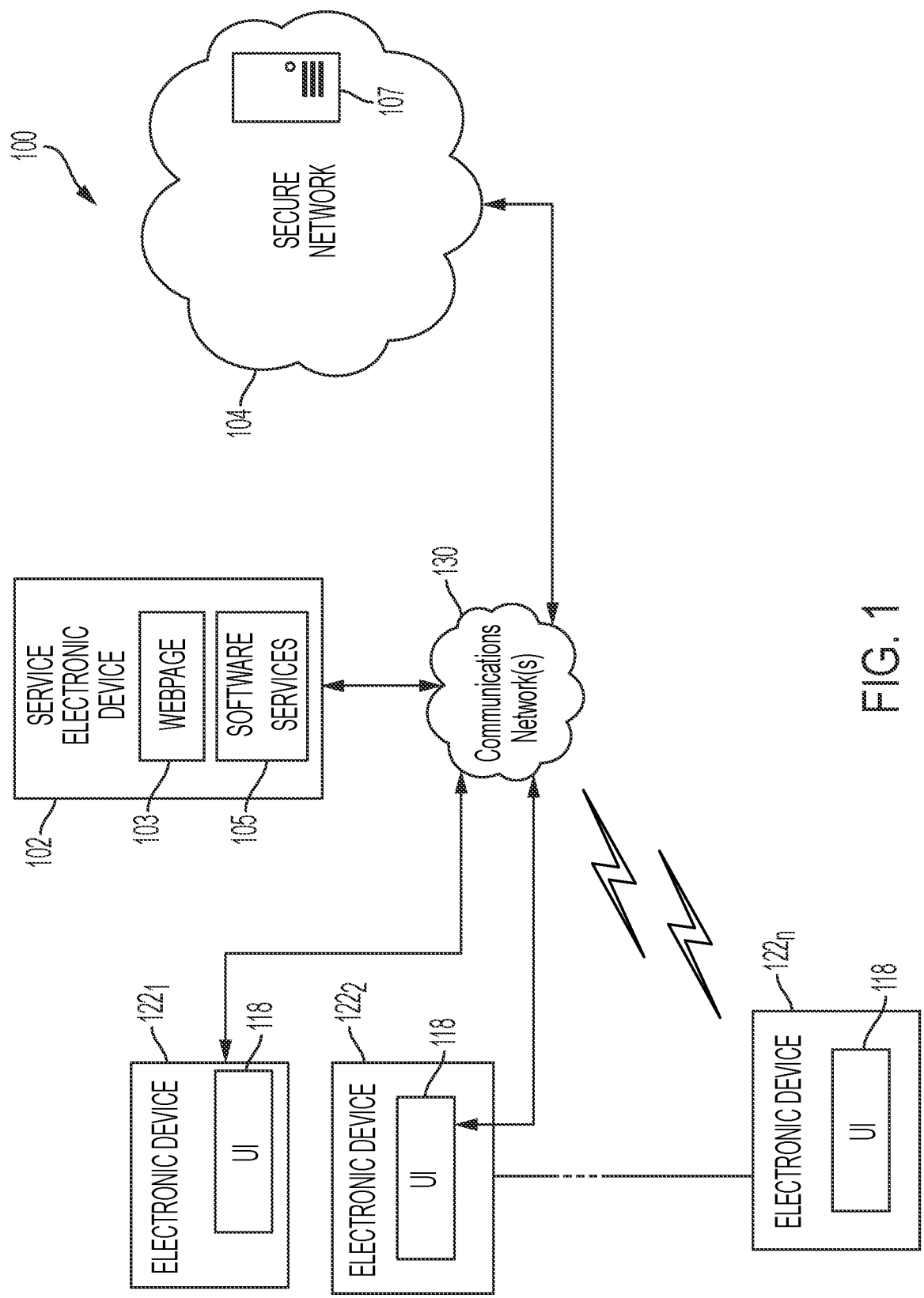
FIG. 1 is a block diagram illustrating an example of a computing environment that enables single-step out-of-band user authentication, according to aspects of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include, for example, smartphones, personal digital assistants, cameras, tablet devices, electronic readers, personal computers, servers, and the like.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, when terms such "first" and "second" are used to modify a noun, such use is simply intended to distinguish one item from another, and is not intended to require a sequential order unless specifically stated.

Aspects of the present disclosure involve a system that enables simplified, single-step, out-of-band user authentication for users requesting access to various software services and/or related content, such as requesting access to a webpage, software service, software application, and/or the like.

Generally, out-of-band user authentication represents a type of two-factor authentication process that involves a username and password processed through a first, primary, communication channel and a secondary verification method through a separate communication channel that is different from the primary communication channel. For example, a typical out-of-band authentication process may involve providing: 1) a username and password of a user (first factor) to a webpage, application, or service; and 2) a piece of unique data or information (second factor) that only the user can immediately access and know, such as a physical token. Using a username/password in conjunction with a piece of information that only the user knows makes it harder for potential intruders to gain access to the webpage, application, or service and thereby obtain private data and functionality.

The use of out-of-band user authentication may present challenges. For example, since out-of-band user authentication involves two steps, the process is inconvenient and cumbersome to users—the users have to provide credentials to an original application or website, obtain a separate key from a separate communication channel, memorize the obtained key, and re-enter it at the original application or website to access the desired webpage, application, or service. Such a process is time consuming and error-prone. Moreover, out-of-band user authentication mechanisms are vulnerable to "man-in-the-middle attacks" because the authenticating entity cannot verify the authenticity of the entity supplying the authentication credentials. Finally, out-of-band user authentication mechanisms are vulnerable to "Trojan Attacks", wherein malicious software referred to as a "Trojan" is installed on user's computer. Then, when a user logs into a secure software service, the Trojan software manipulates the software to obtain proprietary information and software.

The systems disclosed in the present application solves these specific technical problems, among others, by providing a single-step, out-of-band user authentication process. More specifically, the disclosed system simplifies the two-factor authentication process by replacing the username and password login pattern (i.e., the first factor) with a single-step pattern that uses a public-key and location information identifying an expected storage location of validated user authentication data. Once the single-step pattern has been established, the system automatically authenticates users (i.e., allows users to login) based on secure responses identifying the expected storage location, thereby proving the authentication of the user.

FIG. 1 illustrates an example of a computer network 100 (e.g., a telecommunications network) that may be used to implement single-step out-of-band user authentication without the repeated use of user credentials, such as a username and password. The computer network 100 may include various devices communicating and functioning together to enable single-step out-of-band user authentication. As illustrated, a communications network 130 may allow for communication in the computer network 100. The communications network 130 may include one or more wireless networks such as, but not limited to, one or more of a Local Area Network (LAN), Wireless Local Area Network (WLAN), a Personal Area Network (PAN), Campus Area Network (CAN), a Metropolitan Area Network (MAN), a Wde Area Network (WAN), a Wireless Wde Area Network (VWVAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MIMS, extensible messaging and presence protocol (XMPP), real time messaging protocol (RTMP), instant messaging and presence protocol (IMPP), instant messaging, USSD, IRC, or any other wireless data networks or messaging protocols. In various embodiments, a communications network 130 may include one or more wired networks.

In an illustrative usage scenario, a user may interact with user-interface (UI) 118 of one or more electronic devices $122_1, 122_2, \ldots 122_N$ to request access to various services, such as a webpage, a site, software service, application, content and/or the like (referred to throughout this disclosure as a "service"), located at a service computing device 102 that is associated with one or more services (illustrated as webpage 103 and software service 105). The one or more electronic devices $122_1, 122_2, \ldots 122_N$, may be a personal computer, work station, mobile device, mobile phone, tablet device, processor, and/or other processing device capable of implementing and/or executing processes, software, applications, etc., that includes network-enabled devices and/or software, such as a user-interface 118 for communication over the communications network 130 (e.g., browsing the internet). Additionally, the one or more electronic devices $122_1, 122_2, \ldots 122_N$, may include one or more processors that process software or other machine-readable instructions and may include a memory to store the software or other machine-readable instructions and data. In various embodiments, an application or other interface of an electronic device $122_1, 122_2, \ldots 122_N$ may permit the electronic device to communicate with a service electronic device, a server electronic device or another electronic device. For example, an Internet browser or an application that is installed on an electronic device may be used.

The request may be transmitted from the service computing device 102 to an out-of-band secure network 104, which may be any type of private communications computing network including one or more computing devices, such as server electronic device 107. In one specific example, the secure network 104 and/or server electronic device 107 may manage the encryption and decryption of public and/or private keys used to authenticate users involved in a single-step, out-of-band authentication process, wherein the users are requesting access to webpages 103 and/or software services 105 of the service computing device 102.

Figure 2:
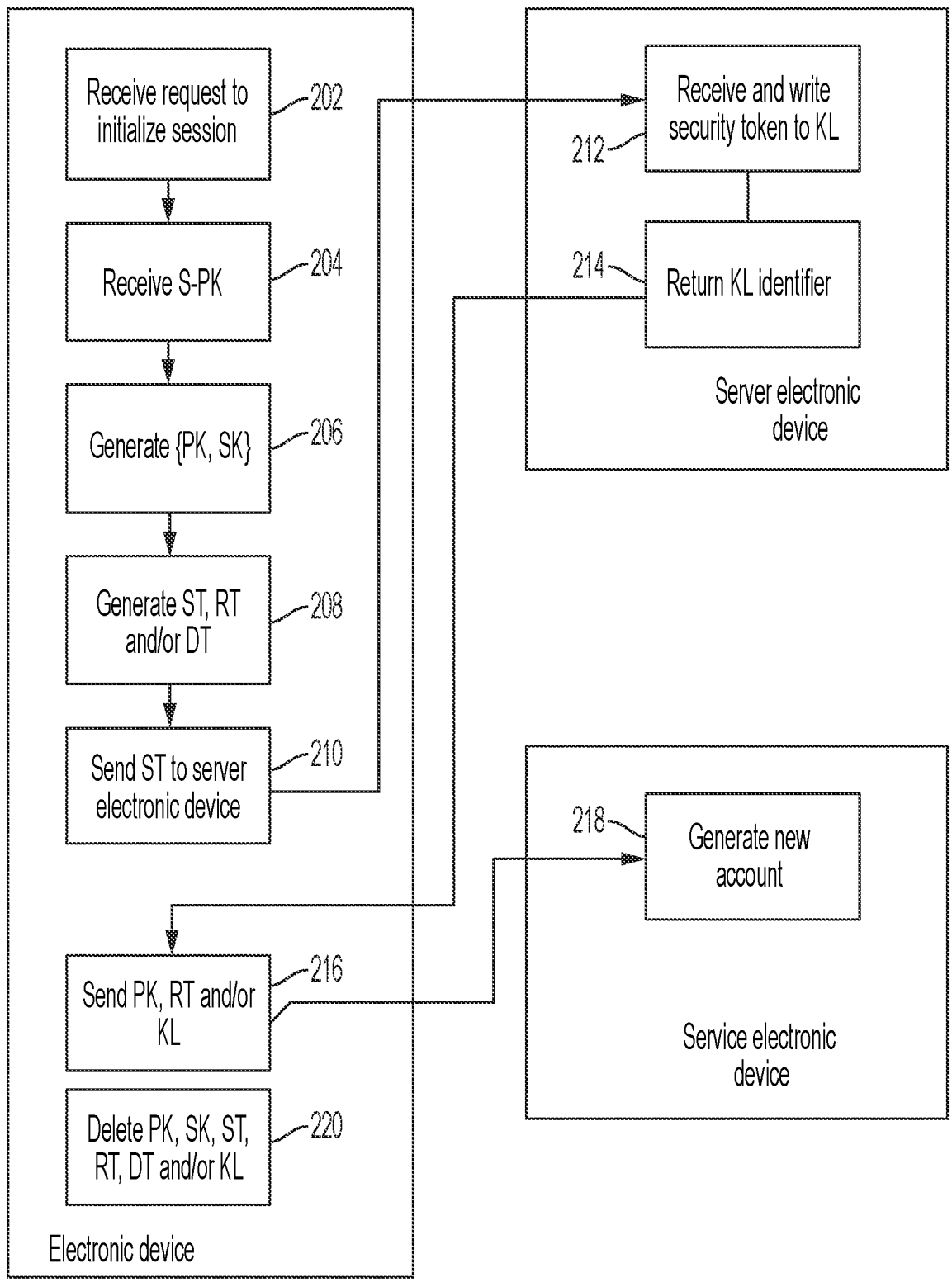
FIG. 2 is a flowchart of an example process for initializing single-step out-of-band authentication, according to aspects of the present disclosure.

FIG. 2 illustrates an example single-step out-of-band user authentication initialization process according to an embodiment. The process 200 may be implemented and/or executed by the computing network 100 of FIG. 1. As illustrated by FIG. 2, an electronic device may receive 202 a request from a user to enter and/or otherwise access a service. At 204, in response to the request, a public key (S-PK) corresponding to the service is received and stored on an electronic device. For example, a S-PK corresponding to a service may be received from one or more service electronic devices. At 206, a strong public/private key pair (PK, SK) (e.g., 256-bit) is generated by and stored on the electronic device.

At 208, a security token (ST), read token (RT) and/or delete token (DT) may be generated by and stored at the electronic device. One or more of the generated tokens may extend one or more benefits or privileges to a holder of the token. For example, a ST may grant to its holder access to certain secret or private information. As another example, a RT may permit its owner to read certain secret or private information. And as another example, a DT may permit its owner to delete certain secret or private information. The ST, RT and/or DT may be randomly generated by the electronic device.

At 210, the ST may be transmitted from the electronic device to a server electronic device of a secure network. The server electronic device may receive 212 the ST, and may write the ST to a memory location (KL) associated with the server electronic. In an embodiment, KL may be assigned randomly. At 214, the server electronic device may return an identifier associated with the KL (KL identifier) to the electronic device for storage. The KL identifier may uniquely identify KL, and may be an address, a pointer, or other identifier. At 216, the electronic device may transmit PK, RT and/or the KL identifier to a service electronic device. At 218, the service electronic device may generate a new account using PK, RT and/or the KL identifier. At 220, the PK, SK, ST, RT, DT and/or KL identifier may be deleted from memory associated with the electronic device.

Figure 3:
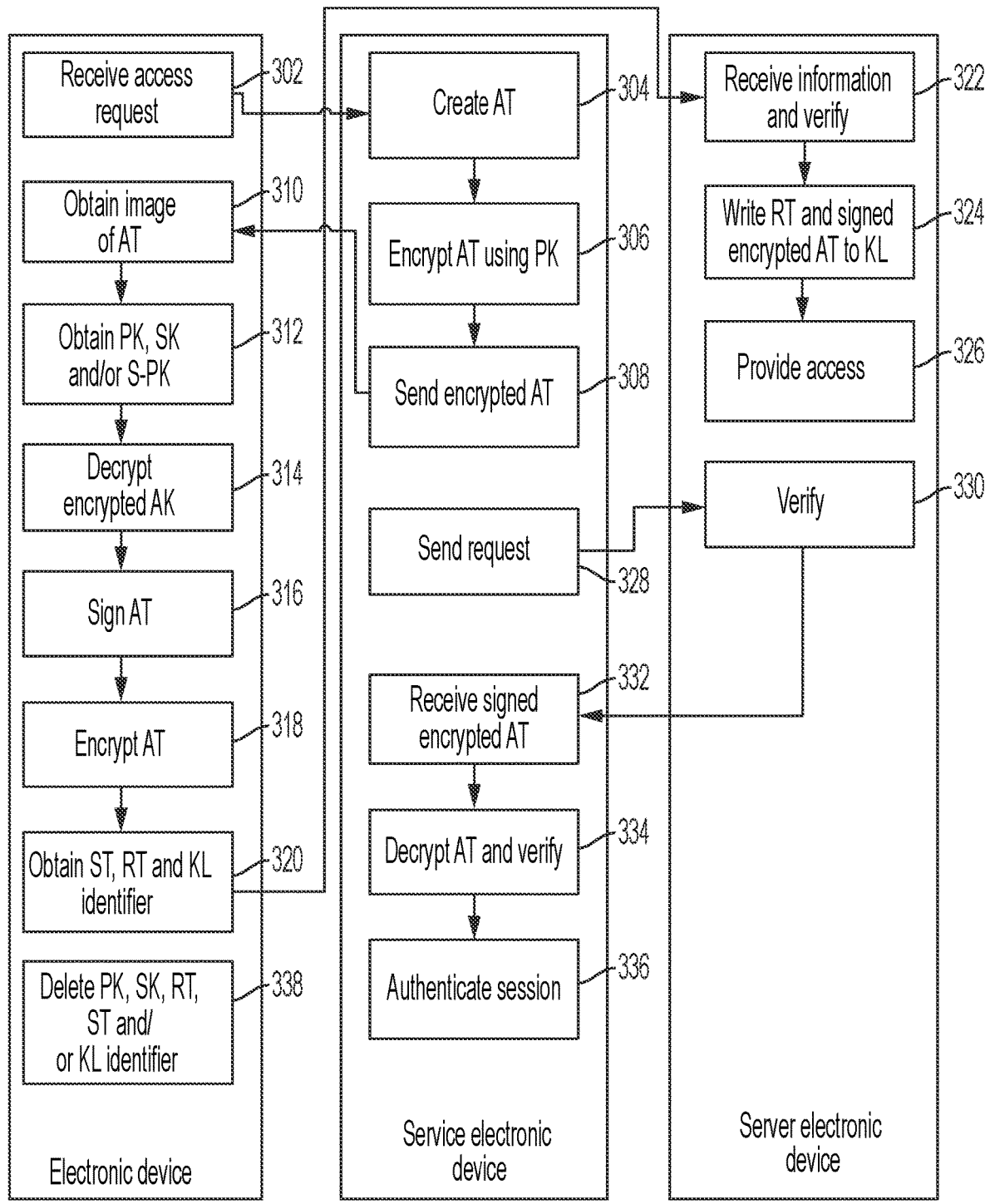
FIG. 3 is a flowchart of an example process for performing single-step out-of-band user authentication, according to aspects of the present disclosure.

FIG. 3 illustrates an example single-step out-of-band user authentication process according to an embodiment. The process 300 illustrated by FIG. 3 may be implemented and/or executed by, for example, the computing network 100 of FIG. 1. As illustrated, a request to initiate a session of a service and/or otherwise access a service may be received 302 by an electronic device. This request may be received 302 by an electronic device from a user. Referring back to FIG. 1, a user may interact with a particular electronic device $122_1, 122_2, \ldots 122_N$ to send a request to the service computing device 102 of the secure network 104 requesting access to the services (e.g., webpage 103 and/or the software service 105).

In response to the request, at 304, the service electronic device may generate an authentication token ("AT"). The service electronic device may encrypt 306 the AT using the PK of the electronic device. At 308, the service electronic device may transmit the encrypted AT to the particular electronic device. In various embodiments, the service electronic device may transmit the encrypted AT to an electronic device embedded in an image, a graphic and/or the like. For instance, the service may transmit the encrypted AT to an electronic device embedded in a Quick Response (QR) code. At 310, the electronic device may obtain the encrypted AT, such as by scanning the QR code that includes the encrypted AT. At 312, the electronic device may obtain PK, SK and/or S-PK from storage of the electronic device.

At 314, the electronic device may decrypt the encrypted AT using the obtained SK. At 316, the electronic device may sign the AT with the SK to generate a signed authentication token ($AT^{SK}$). At 318, the electronic device may encrypt $AT^{SK}$ with S-PK to generate a signed-encrypted authentication token ($(AT^{SK})^{S-PK}$). At 320, ST, RT, and/or the indication of KL may be obtained from storage on the particular electronic device.

At 322, a server electronic device may receive $(AT^{SK})^{S\text{-}PK}$ ST, RT and/or the KL identifier from an electronic device and may verify that ST corresponds to information stored at KL. The server electronic device may write 324 RT and $(AT^{SK})^{S\text{-}PK}$ to KL. At 326, the particular electronic device may be notified that the authentication is done and provides access to the service.

At 328, the service may send a request for $(AT^{SK})^{S\text{-}PK}$ to the server electronic device that includes RT and the KL identifier. At 330, the server electronic device may verify that RT corresponds to the information stored at KL, and may return information purporting to be $(AT^{SK})^{S\text{-}PK}$ when there is a correlation. In an embodiment, the service may receive 332 the sent information from the server electronic device. The service may decrypt 334 the sent information with S-SK and then verify the signature using PK.

At 336, if the decrypted information corresponds to AT, the user's session may be authenticated. At 338, the PK, SK, RT, ST and/or KL indicator may be deleted from the electronic device.

Figure 4:
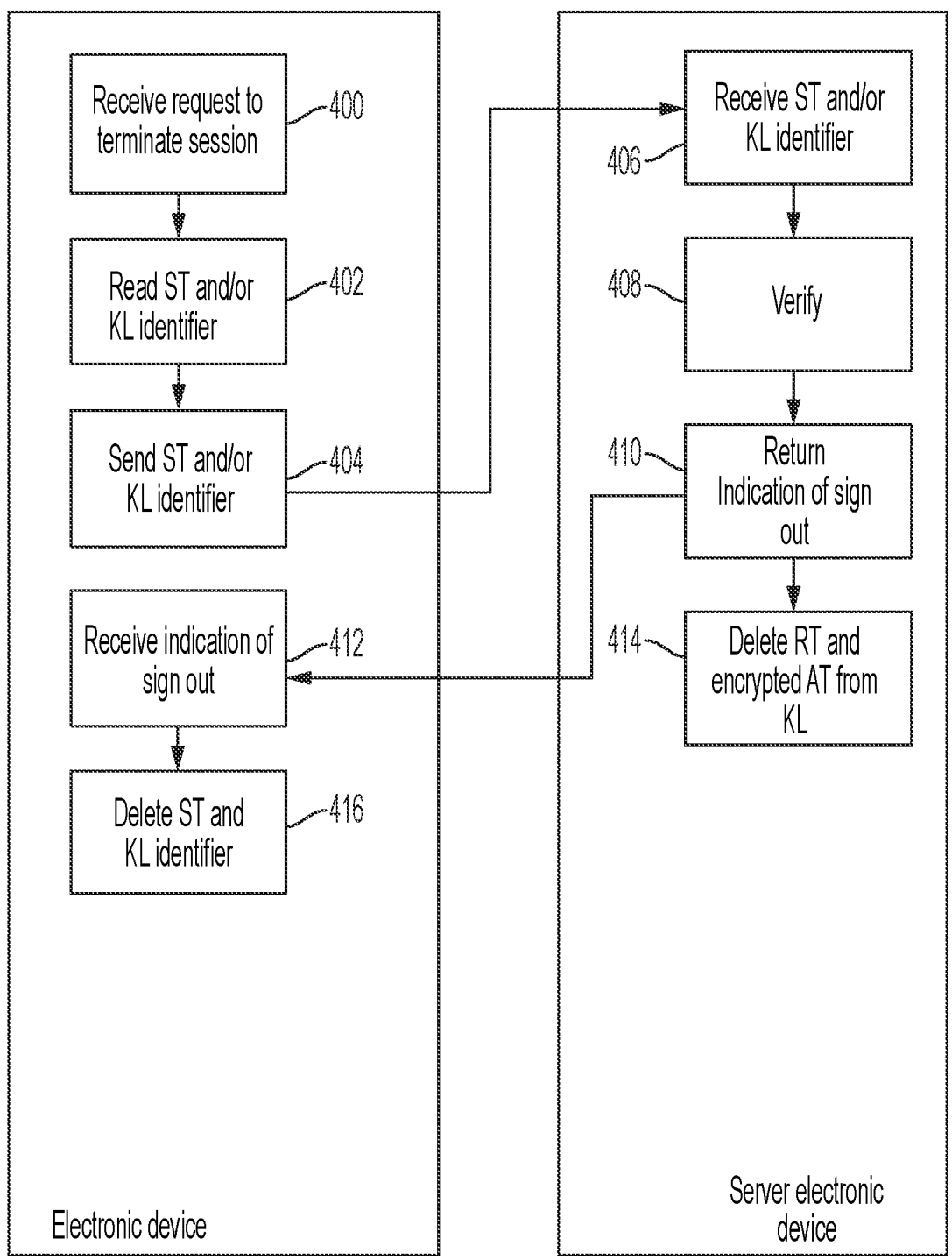
FIG. 4 is a flowchart of an example process of terminating a service session request according to aspects of the present disclosure.

FIG. 4 illustrates an example single-step out-of-band user revocation process according to an embodiment. As illustrated by FIG. 4, an electronic device may receive 400 an indication from a user that the user wishes to terminate a session of a service. The electronic device may read 402 ST and/or the KL identifier from storage of the electronic device. The electronic device may transmit 404 the KL identifier and/or ST to a server electronic device. The server electronic device may receive 406 the KL identifier and/or ST. The server electronic device may verify 408 that ST corresponds to information stored at KL. Depending on the result of the verification, the server electronic device may return 410 an indication of sign out. For example, if ST matches information that is stored at KL, the server electronic device may return 410 an indication of a successful sign out to the electronic device. If ST does not match information stored at KL, the server electronic device may return 410 an indication that sign out was not successful. The electronic device may receive 412 the indication of sign out.

In various embodiments, the server electronic device may delete 414 RT and/or $(AT^{SK})^{S\text{-}PK}$ from KL. The electronic device may delete 416 ST and/or the indication of KL from storage on the electronic device.

Figure 5:
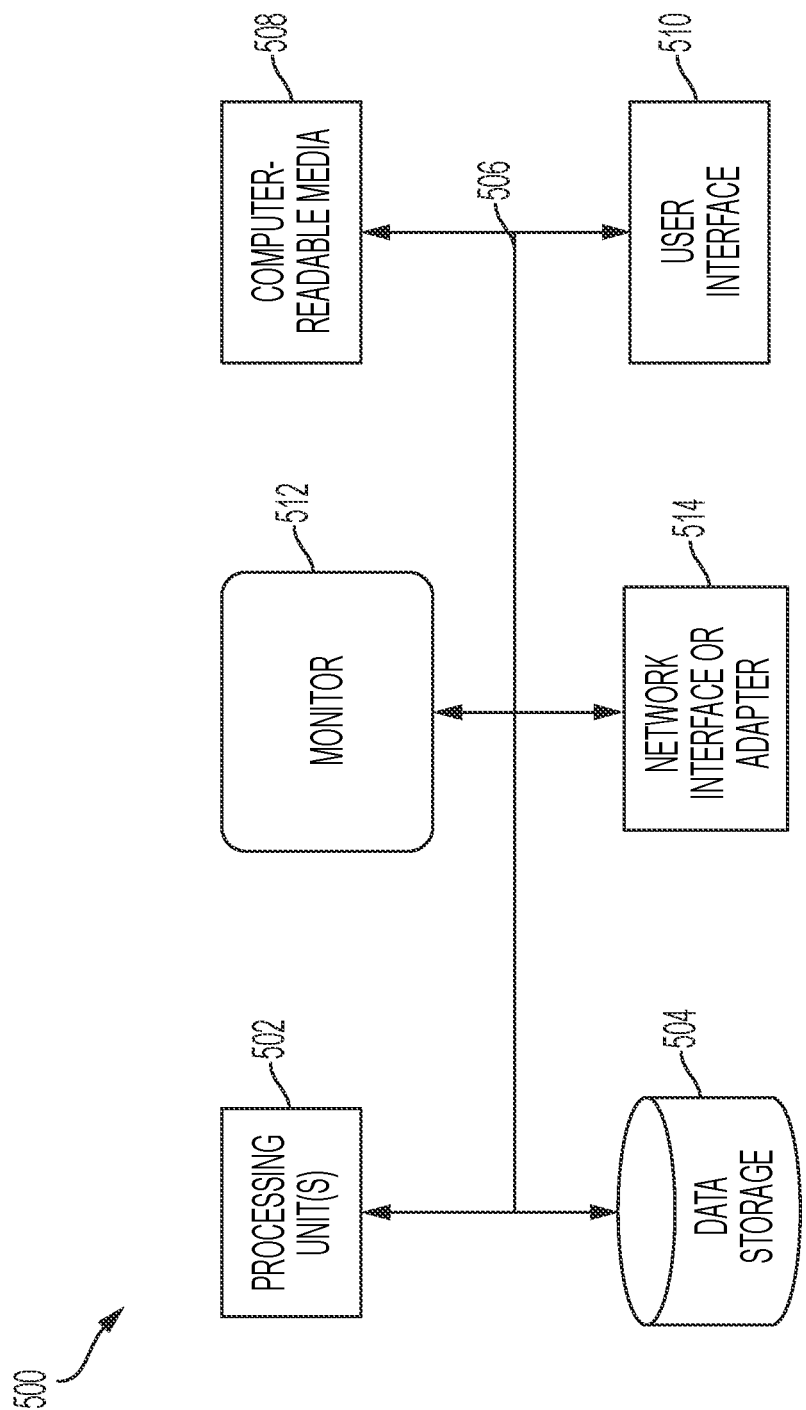
FIG. 5 is a block diagram illustrating an example computing device specifically implemented to enable single-step out-of-band authentication, according to aspects of the present disclosure.

FIG. 5 illustrates an example of a suitable computing and networking environment 500 that may be used to implement various aspects of the present disclosure described in FIGS. 1-4. As illustrated, the computing and networking environment 500 includes a general purpose computing device 500, although it is contemplated that the networking environment 500 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computing device 500 may include various hardware components, such as a processing unit 502, a data store 504 (e.g., a system memory), and a system bus 506 that couples various system components of the computing device 500 to the processing unit 502. The system bus 506 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 500 may further include a variety of computer-readable media 508 that includes removable/non-removable media and volatile/nonvolatile media, but excludes transitory propagated signals. Computer-readable media 508 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 500. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 504 includes computer storage media in the form of volatile/nonvolatile memory such as read only memory (ROM) and random access memory (RAM). A basic input/output system (BIOS), containing the basic routines that help to transfer information between elements within the computing device 500 (e.g., during start-up) is typically stored in ROM. RAM typically contains data and/or program modules that are immediately accessible to and/or presently being operated on by processing unit 502. For example, in one embodiment, data storage 504 holds an operating system, application programs, and other program modules and program data.

Data storage 504 may also include other removable/non-removable, volatile/nonvolatile computer storage media. For example, data storage 504 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computing device 400.

A user may enter commands and information through a user interface 510 or other input devices such as a tablet, electronic digitizer, a microphone, keyboard, and/or pointing device, commonly referred to as mouse, trackball, or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 502 through a user interface 510 that is coupled to the system bus 506, but may be connected by other interface and bus structures, such as a parallel port, game port or a universal serial bus (USB). A monitor 512 or other type of display device is also connected to the system bus 506 via an interface, such as a video interface. The monitor 512 may also be integrated with a touch-screen panel or the like.

The computing device 500 may operate in a networked or cloud-computing environment using logical connections of a network interface or adapter 514 to one or more remote devices, such as a remote computer. The remote computer may be a personal computer, a server, a router, a network PC, a peer device or other common network node, and typically includes many or all of the elements described above relative to the computing device 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 500 may be connected to a public and/or private network through the network interface or adapter 514. In such embodiments, a modem or other means for establishing communications over the network is connected to the system bus 506 via the network interface or adapter 514 or other appropriate mechanism. A wireless networking component including an interface and antenna may be coupled through a suitable device such as an access point or peer computer to a network. In a networked environment, program modules depicted relative to the computing 500, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

The invention claimed is:

1. A method of performing out-of-band user authentication, by a server electronic device, of an electronic device's session on a service associated with a service electronic device, comprising:

by the server electronic device:

receiving, from the electronic device, a security token, read token, memory location, and a signed encrypted authentication token, wherein the signed encrypted authentication token is an encrypted authentication token, received by the electronic device from the service electronic device, that has been decrypted using a private key, signed, and encrypted using a service public key by the electronic device;

verifying that the security token corresponds to information stored at the memory location;

writing the read token and the signed encrypted authentication token to the memory location;

receiving a request for the signed-encrypted authentication token from a service electronic device, wherein the request includes the read token and an indication of the memory location accessible by the server electronic device;

verifying that the read token matches information stored at the memory location; and in response to verifying that the read token matches information stored at the memory location, sending the signed-encrypted authentication token to the service electronic device to authenticate the electronic device's session using the signed encrypted authentication.

2. The method of claim 1, wherein the memory location is associated with a stored location of the signed-encrypted authentication token in a computer storage media of the server electronic device.

3. The method of claim 1, further comprising, by the service electronic device:

encrypting an authentication token to generate the encrypted authentication token; and sending the encrypted authentication token to the electronic device for the signature.

4. The method of claim 1, further comprising, by the service electronic device:

decrypting the signed-encrypted authentication token; and verifying the signature associated with the electronic device.

5. The method of claim 1, further comprising, by the server electronic device, prior to receiving the request for the signed-encrypted authentication token:

writing the security token to the memory location.

6. The method of claim 5, further comprising, the server electronic device, sending the indication of the memory location to the electronic device.

7. The method of claim 5, further comprising, by the server electronic device, after sending the signed-encrypted authentication token to the service electronic device:

receiving at least one of the security token and indication of the memory location;

verifying that the security token matches information stored at the memory location; and sending an indication of a successful sign out to the electronic device.

8. A system for giving an electronic device access to a service provided by a service electronic device, comprising:

a server electronic device comprising:

one or more computing devices; and memory storing instructions, the instructions being executable by the one or more computing devices, wherein the one or more computing devices are configured to:

receive, from the electronic device, a security token, read token, memory location, and a signed encrypted authentication token, wherein the signed encrypted authentication token is an encrypted authentication token, that was received by the electronic device from the service electronic device, that has been decrypted using a private key, signed, and encrypted using a service public key by the electronic device;

verify that the security token corresponds to information stored at the memory location;

write the read token and the signed encrypted authentication token to the memory location;

receive a request for the signed-encrypted authentication token from a service electronic device, wherein the request includes a read token and an indication of the memory location accessible by the server electronic device;

verify that the read token matches information stored at the memory location; and in response to verifying that the read token matches information stored at the memory location, send the signed-encrypted authentication token to the service electronic device to authenticate the electronic device's session using the signed encrypted authentication.

9. The system of claim 8, wherein the memory location is associated with a stored location of the signed-encrypted authentication token in a memory of the server electronic device.

10. The system of claim 8, wherein the service electronic device is configured to:

encrypt an authentication token to generate the encrypted authentication token; and send the encrypted authentication token to the electronic device for the signature.

11. The system of claim 8, wherein the service electronic device is configured to:

decrypt the signed-encrypted authentication token; and verify the signature associated with the electronic device.

12. The system of claim 8, wherein the one or more computers are configured to, prior to receiving the request for the signed-encrypted authentication token:

write the security token to the memory location.

13. The system of claim 12, wherein the one or more computers are configured to send the indication of the memory location to the electronic device.

14. A non-transitory computing-device readable storage medium on which computing-device readable instructions of a program are stored, the instructions, when executed by one or more computing devices, causing the one or more computing devices to perform a method in a system comprising a service electronic device associated with a service, an electronic device seeking to access the service, and server electronic device, the method comprising:

by the server electronic device:

receiving, from the electronic device, a security token, read token, memory location, and a signed encrypted authentication token, wherein the signed encrypted authentication token is an encrypted authentication token, received by the electronic device from the service electronic device, that the electronic device decrypted using a private key, signed, and encrypted using a service public key;

verifying that the security token corresponds to information stored at the memory location;

writing the read token and the signed encrypted authentication token to the memory location;

receiving a request for the signed-encrypted authentication token from a service electronic device, wherein the request includes a read token and the indication of a memory location accessible by the server electronic device;

verifying that the read token matches information stored at the memory location; and in response to verifying that the read token matches information stored at the memory location, sending the signed-encrypted authentication token to the service electronic device to authenticate the electronic device's session using the signed encrypted authentication.

15. The non-transitory computing-device readable storage medium of claim 14, wherein the memory location is associated with a stored location of the signed-encrypted authentication token in a memory of the server electronic device.

16. The non-transitory computing-device readable storage medium of claim of claim 14, further comprising, by the service electronic device:

encrypting an authentication token to generate the encrypted authentication token; and sending the encrypted authentication token to the electronic device for the signature.

17. The non-transitory computing-device readable storage medium of claim of claim 14, further comprising, by the service electronic device:

decrypting the signed-encrypted authentication token; and verifying the signature associated with the electronic device.

* * * * *